United States Patent [19]

Morrow, Jr.

[11] Patent Number: 4,662,774

[45] Date of Patent: May 5, 1987

[54] PARABOLIC END FITTING

[75] Inventor: Fred E. Morrow, Jr., Big Spring, Tex.

[73] Assignee: Fiberflex Products, Ltd., Houston, Tex.

[21] Appl. No.: 583,849

[22] Filed: Feb. 27, 1984

Related U.S. Application Data

[63] Continuation-in-part of Ser. No. 430,652, Oct. 12, 1982, abandoned.

[51] Int. Cl.⁴ ............................................. F16B 11/00
[52] U.S. Cl. .................................... 403/266; 403/265
[58] Field of Search ................ 403/265, 266, 267, 268

[56] References Cited

U.S. PATENT DOCUMENTS 3,085,305  4/1963  Colombet et al. ................... 403/275
4,360,288 11/1982  Rutledge, Jr. et al. ......... 403/275 X
4,401,396  8/1983  McKay ................................. 403/13

FOREIGN PATENT DOCUMENTS 861347 12/1952  Fed. Rep. of Germany ...... 403/268
681550 10/1952  United Kingdom ................ 403/267

Primary Examiner—Andrew V. Kundrat

[57] ABSTRACT

In the present invention a suitable end fitting is provided for fiberglass or plastic rods wherein the interior of the end fitting is defined by a chamber having an opening in an end and a side wall defined by a plurality of parabolic curved compression grooves and alternate spaced neck members wherein the angle between each of such parabolic curve compression grooves and the neck members increases in said chamber from the opening to the end of said chamber.

2 Claims, 1 Drawing Figure

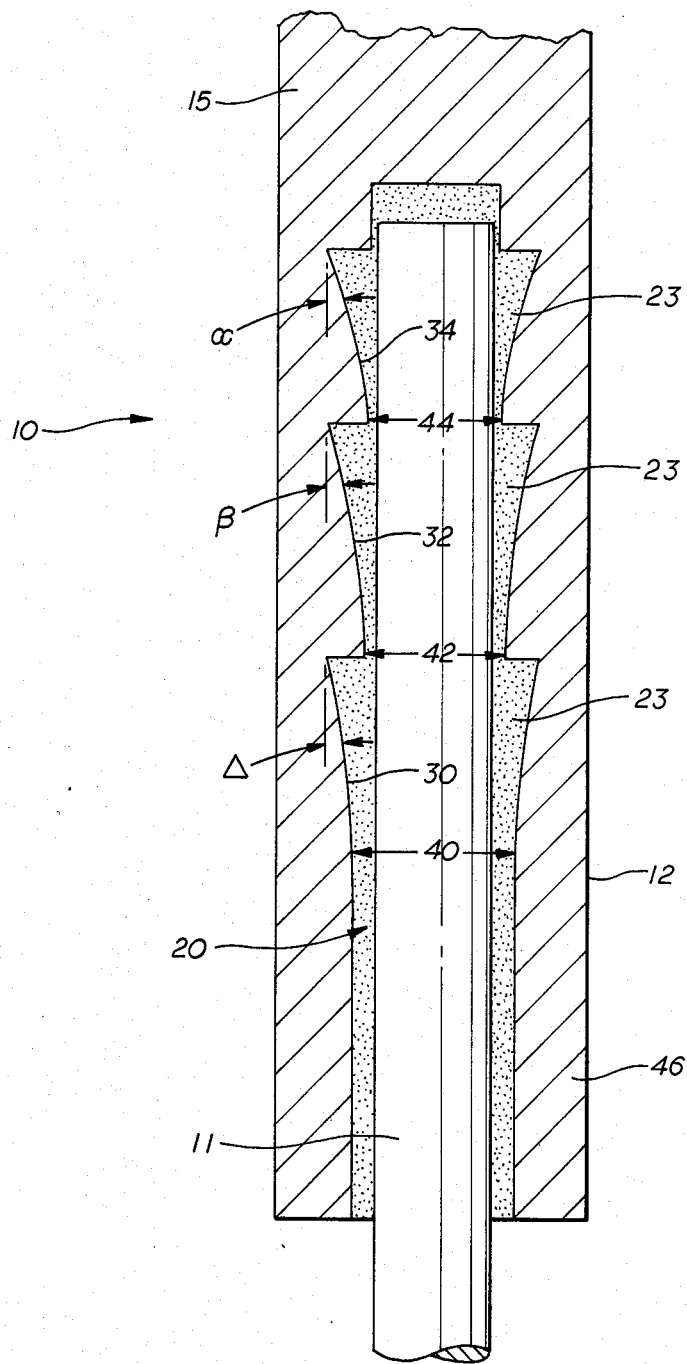

PARABOLIC END FITTING

This is a continuation-in-part of U.S. patent application Ser. No. 430,652, filed on Oct. 12, 1982 now abandoned.

BACKGROUND OF THE INVENTION

The present invention relates to a new and improved fiberglass rod end connection.

DESCRIPTION OF THE PRIOR ART

The prior art is, as far as applicant is presently aware, disclosed in co-pending application Ser. No. 76,373 filed Sept. 17, 1979; U.S. Pat. Nos. 4,315,699 to Lusk; 2,404,385 Fritts; 246,898Krotz; 2,475,741 to Goeller, 3,363,731 to Gashe, et al; 3,499,129 to Hulteen, et al; 3,551,959 to Mastalski; 4,051,929 to Parfitt; German Pat. No. 451,448 issued October, 1927; German Pat. No. 704,800; U.S. patent application Ser. No. 956,740 filed Nov. 1, 1978; U.S. Pat. Nos. 315,699 to Lusk; Newling 4,195,691; Knutz, et al 2,825,752; Forssell 1,689,281; Higgins 2,874,937; ·Portz, et al 3,018,140; Smith 2,652,231; Leslie 3,661,388; Higgins 2,874,938; French Pat. No. 1,210,779; U.S. Pat. Nos. 4,198,538 Lusk; Parker 1,064,764; United Kingdom Pat. No. 681,550 issued to Brown; Canadian Pat. No. 1,072,191 issued to Lusk; U.S. Pat. Nos. 4,205,926 Carlson; Bauer, et al 4,127,741; Napple 3,461,539; Cooke 2,266,357; Grable 4,024,913; Yonkers 3,549,791; Cunningham 3,737,556; Yonkers 3,534,989; German application No. 2,511,809 issued to Densch.

BRIEF DESCRIPTION OF THE DRAWINGS

The FIGURE is a cross-sectional area disclosing the concept of the end fitting of the present invention with one end of a suitable fiberglass rod.

DESCRIPTION OF THE INVENTION

As set forth in the FIGURE a plastic or fiberglass sucker rod 11 of any suitable construction as known in the prior art is partially illustrated. It is to be understood that such rod 11 may form, along with another suitable end fitting mounted on the other end of such rod (not shown), a sucker rod and thereafter, such sucker rods may be connected in an end to end relationship to form a sucker rod string (not shown) for the production of hydrocarbons or the like.

In addition, such rod 11 may be mounted with the end fitting as hereinafter described in any suitable manner wherein it is desired to mount a suitable end fitting with a suitable fiberglass or plastic rod 11 for any purpose.

As further illustrated in the FIGURE, the end fitting is generally designated at 10 and includes end member 15 which may be mounted by any suitable means to any other suitable end fitting to form an end-to-end relationship for such end fittings with rods in the manner so desired. The end fitting 10 also includes an exterior surface 12 and such end fitting 10 may be constructed of any suitable material such as steel or the like.

As illustrated in the FIGURE, rod 11 is positioned in an interior chamber 20 formed in the end fitting 10 by positioning the rod 11 upwardly and into an opening 23. The interior 20 is normally filled with suitable epoxy resin 23 which, when cured, bonds to the rod 11 in a manner known in the art. The interior of the end fitting 20 comprises a plurality of curved parabolic surfaces illustrated at 30, 32 and 34 which curve outwardly from rib area 46 toward the rod 11 to form compression ribs and grooves. Thus, the parabolic width 40, 42 and 44 is illustrated as being wider than at the spaced rib areas 46. As further illustrated in the FIGURE angles beta $\beta$ and alpha $\alpha$ are disclosed with angle alpha $\alpha$ being larger than the angle beta $\beta$ and angle beta $\beta$ being larger than the angle delta $\Delta$. In accordance with the present invention, the larger the angle, the wider the area of the parabolic curve width area 40 is wider than are 42 which in turn is wider than area 44.

In the operation of the present invention, in order to assemble the rod with the end connection, the rod is filled with a suitable epoxy or the like 23 in the interior 20 thereof. It is also known in the art the epoxy after curing will bond with the rod 11 and pull away from the interior formation of the end fitting member 10.

It is required that a sucker rod have at least over 21,000 pounds tensile strength as required by American Petroleum Institute Standards and sometimes many more thousand pounds and since normal sucker rods also have to withstand high compressive forces, the internal construction of the connection member 10 of the present invention is quite important since it is designed to enable the lowermost parabolic compression groove 40 to accept smaller compressive and tensile forces since the lowermost compression groove 40 has a smaller angle and is thus wider than the next adjacent connection groove 42 which means that the greater width of groove 40 enables a lesser compression and tensile load spread over the width of compression joint or groove 40. Similarly, the compression joint or groove 42, while having more compression than tensile compression joint 40, is capable of withstanding less tensile and compression load than the compression joint 44, since the angle beta $\beta$ and its corresponding parabolic curve 32, which define the rib of joint 42, are larger than the angle delta $\Delta$ and its corresponding parabolic curve edge 34. Thus, in the present invention, each of the ribs of compression joints 40, 42 and 44 accept tensile and compression pressure loads caused by the tension and compressive stresses of the sucker rod strings but, because of the different parabolic end fitting angles, the compression and tension loads are all equal in the compression joints 40, 42 and 44.

While the present invention has been described as relating to sucker rods it is to be understood that such end connection can relate to any end connection wherein it is desired to mount a suitable end fitting with a fiberglass rod connection through the use of compression grooves or joints and the like.

What is claimed is:

1. An end fitting for mounting on the end of a solid fiberglass or plastic rod comprising:
  an interior hollow chamber for receiving the rod and suitable epoxy for enabling bonding to the rod, wherein (a) said interior chamber is defined by an opening and an end and wherein the side walls of such chamber are defined by a plurality of parabolic curved compression joints spaced between a plurality of rib members and wherein the angle between the rib members and the parabolic curved joints increases with each of said plurality of parabolic curved compression joints from the opening of said chamber to the end of said chamber, the smallest diameters of each compression joint decreasing with each of said plurality of compression joints from the opening of said chamber to the end thereof, to enable each of said parabolically curved compression joints and areas therewith to accept an equal tensile and compressive load from said opening to said end of said end fitting.

2. A sucker rod end fitting for mounting on the end of a solid fiberglass or plastic rod wherein;
 (a) said rod end generally defines a hollow generally circular chamber for receiving said rod and a sutiable curable bonding material for bonding said rod end to said rod;
 (b) said interior chamber being deinfed by an opening extending to a bottom end;
 (c) the side walls of said chamber being defined by a plurality of rib members;
 (d) each of said rib members defining a parabolically curved surface to form a compression joint;
 (e) the angle of each of said parabolically curved surfaces increasing for each successive said rib member spaced away from the opening of said chamber toward said bottom end of said chamber;
 (f) the smallest diameter of each compression joint decreasing for each successive compression joint spaced away from the opening of said chamber toward said bottom end thereof;
 (g) each said compression joint as comprised of said parabolically curved surfaces of said rib members being adapted to accept an equal tensile load as part of a total load applied in tension between said rod and said rod end.

* * * * *